(12) United States Patent
Wedi

(10) Patent No.: US 6,753,061 B1
(45) Date of Patent: Jun. 22, 2004

(54) FLEXIBLE SANDWICH PANEL WITH HONEYCOMB STRUCTURE

(76) Inventor: Stephan Wedi, Kolpingstrasse 52-54, D-48282 Emsdetten (DE)

( * ) Notice: Subject to any disclaimer, the term of this patent is extended or adjusted under 35 U.S.C. 154(b) by 0 days.

(21) Appl. No.: 10/395,648

(22) Filed: Mar. 21, 2003

(30) Foreign Application Priority Data

Jan. 10, 2003 (DE) .......................................... 103 00 584

(51) Int. Cl.[7] .............................................. B32B 3/12
(52) U.S. Cl. .................. 428/73; 428/116; 428/117; 428/219; 428/294.7; 428/311.71; 428/311.51; 428/312.9; 428/313.3; 428/314.2; 428/340; 428/365; 428/435; 428/5.32; 428/703; 52/793.1
(58) Field of Search ................................ 428/688, 689, 428/702, 703, 73, 532, 426, 435, 364, 365, 292.1, 293.4, 294.7, 304.4, 311.11, 311.51, 311.71, 312.2, 312.4, 313.3, 116, 314.2, 118, 340, 117, 219; 52/783.1, 793.1

(56) References Cited

FOREIGN PATENT DOCUMENTS

DE          298 09 543          10/1998

*Primary Examiner*—Deborah Jones
*Assistant Examiner*—Wendy Boss
(74) *Attorney, Agent, or Firm*—Milde & Hoffberg, LLP

(57) ABSTRACT

A flexible sandwich panel (100), comprised of a center layer (1) and one or two outer layers (2; 3), where the center layer is made of a polymeric synthetic material, is itself flexible and exhibits a coarse-cell honeycomb structure with open cells (4) in the direction of the upper and lower side of the center layer. The outer layer or layers consist of a hardened mortar that is made flexible with synthetic additives, and that have as their core a web material consisting essentially of fibers, where the exterior side (5) of the hardened outer layer is left unrefined or roughcast in a plaster-like manner. The sandwich panel can be bent without flaking of the outer layers.

21 Claims, 2 Drawing Sheets

FLEXIBLE SANDWICH PANEL WITH HONEYCOMB STRUCTURE

BACKGROUND OF THE INVENTION

The invention relates to a flexible sandwich panel, comprised of a center layer and at least one outer layer, where the center layer is made of a polymeric synthetic material, is itself flexible and exhibits a coarse-cell honeycomb structure with open cells in the direction of the upper and lower side of the center layer, and at least one outer layer or two outer layers that is/are laminated to at least one side of the center layer and that covers or cover said center layer.

Honeycomb structures made of aluminum and fiber papers have been known since the nineteen fifties as core material with a high compressive strength. In the nineteen eighties, honeycomb structures made of thermoplastic synthetics were developed. In particular, polypropylene and polycarbonate have been used as synthetic materials. In the meantime, certain companies in the industry (such as WACOTECH GmbH & Co. KG; TUBUS WABEN GmbH & Co. KG, of Röttenbach, Germany) are offering light, cost-efficient honeycomb structures in a density range of 12 kg/m$^3$ to 80 kg/m$^3$ with various hole diameters.

A flexible sandwich panel of the type mentioned above is referred to in the German Patent Publication DE 298 09 543 U1. This document describes a sandwich panel with a coarse-cell honeycomb support core that is provided with a fiber-enforced top layer. The top layer encases the fiber core. Thermoplastic layers and foils are named as the top layers.

A sandwich panel with such thermoplastic top layers is ill suited for use as a building panel, because, in particular, ceramic panels, such as tiles or other ceramic elements and also strips and boards made of wood materials, cannot be attached easily using simple adhesive technology. Furthermore, the top layers made of synthetic materials are not flame resistant.

SUMMARY OF THE INVENTION

It is, therefore, the principal objective of the present invention to specify a sandwich panel that does not exhibit the aforementioned disadvantages but instead, similar to known mortar-coated panels, offers on its exterior side a surface suitable for attaching ceramic panels or panels made of wood materials, and that is largely flame resistant, yet exhibits a high degree of flexibility.

This objective, as well as other objectives which will become apparent from the discussion that follows, are achieved, in a flexible sandwich panel of the type mentioned above, wherein the outer layer, or at least one of the two outer layers, comprises hardened mortar that is made flexible with synthetic additives, and that has as its core a web material consisting of fibers, and wherein the exterior side of the hardened outer layer is lept unrefined or roughcast in a plaster-like manner.

A mortar suitable for the exterior layers is set forth in various compositions in the description that follows.

As generally known with sandwich panels, the core web material can be connected, in particular welded or glued, to the top side of the center layer. The web material may consist of polymeric fibers in the form of a non-woven material, a woven fabric or a knit fabric, or may consist of glass fibers in the form of a non-woven material, a woven fabric or a knit fabric. Cellulose fibers in the form of a non-woven material may be used as web material as well. With woven or knit fabrics, the average stitch diameter is preferably at most 50% of the mean diameter of a honeycomb of the honeycomb structure of the center layer.

To retain the advantage of light weight and of good thermal insulation, the mortar belonging to an outer layer should fill a maximum of 33% of the hollow space volume of the center layer. On its outer side, the external layer at a certain fill ratio exhibits numerous flat holes that coincide with the openings of the cells and that provide an increased adhesion surface.

For the sandwich panel, cement preferably serves as the mineral component of the mortar on the external layer, but gypsum may also be used. The compressive strength of the sandwich panel, which can be set through the parameters of the center and outer layers, should be set to at least 10 N/cm$^2$ on the outer side that is covered with an outer layer.

The thickness of the un-laminated center layer is preferably between 5 and 25 mm; it consists preferably of polyolefin or polyolefin copolymers; if desired, also of polyester, polycarbonate or polyamide.

The sandwich panel is particularly well suited for use as a building panel and carrier for additional layers, such as wallpaper, paint applications, facing tiles and soundproofing panel elements. Another important type of use is that as an interim layer element between a pipe laying panel covered with pipes, in particular for floor heating, and a top layer that can be walked on, for example parquet boards or carpet floors.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
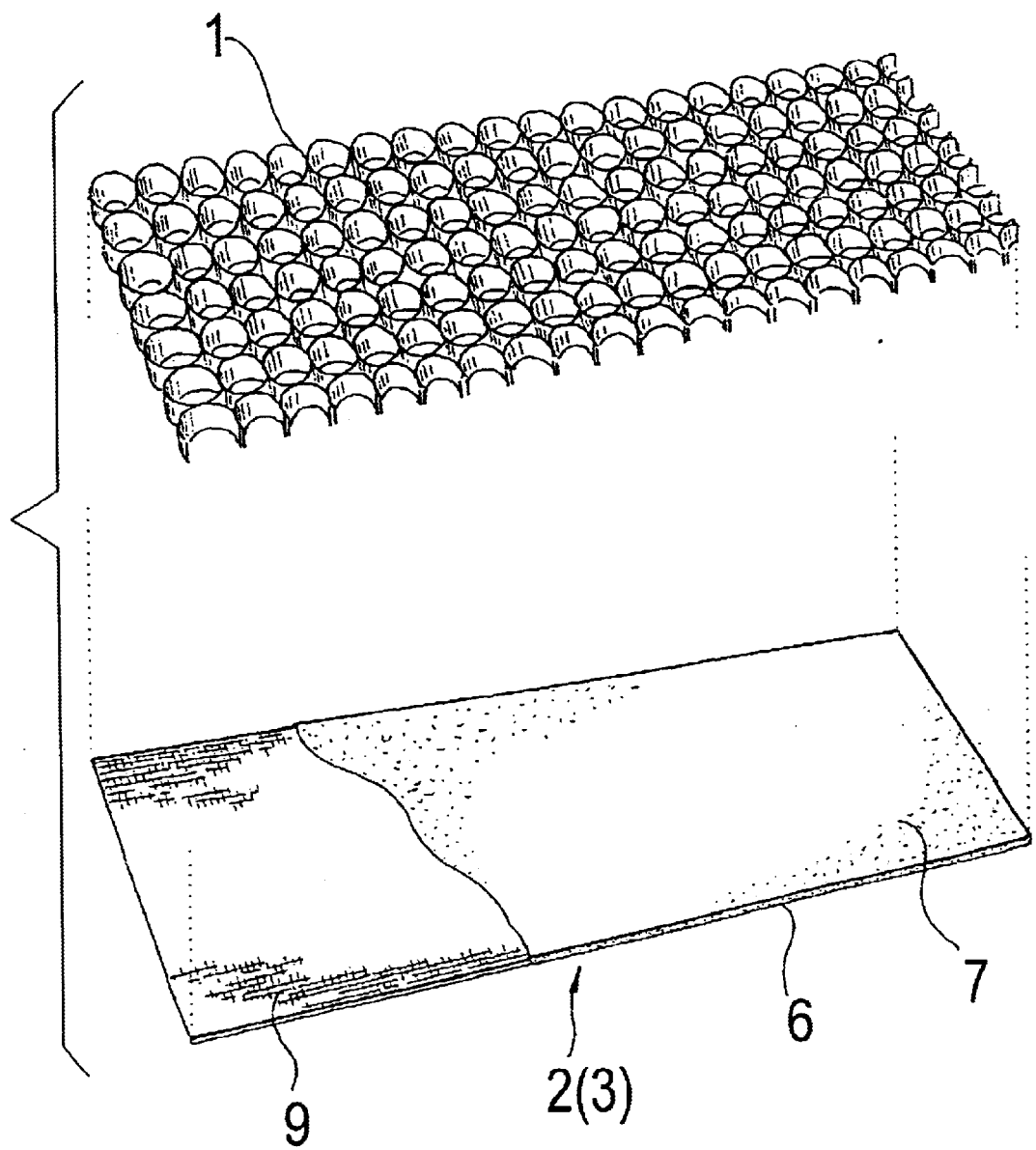
FIG. 1 shows an exploded presentation of a flexible sandwich panel with a center layer and an external layer.
Figure 2:
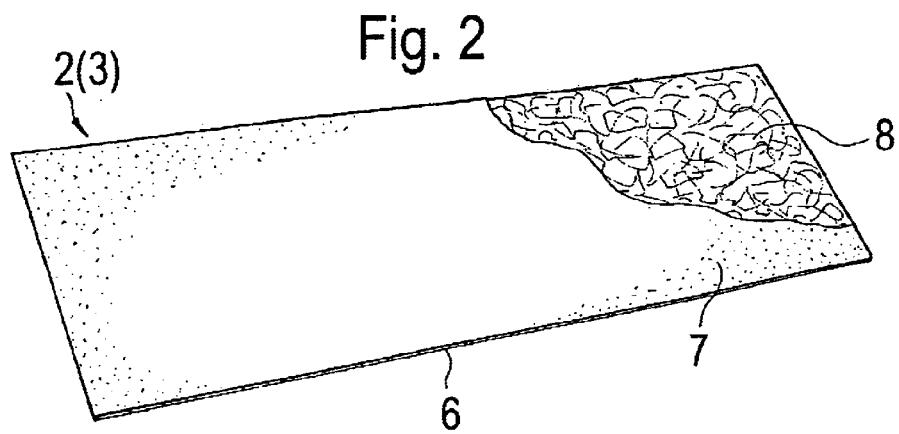
FIG. 2 shows a top view of a sandwich panel with a partially removed external layer.
Figure 3:
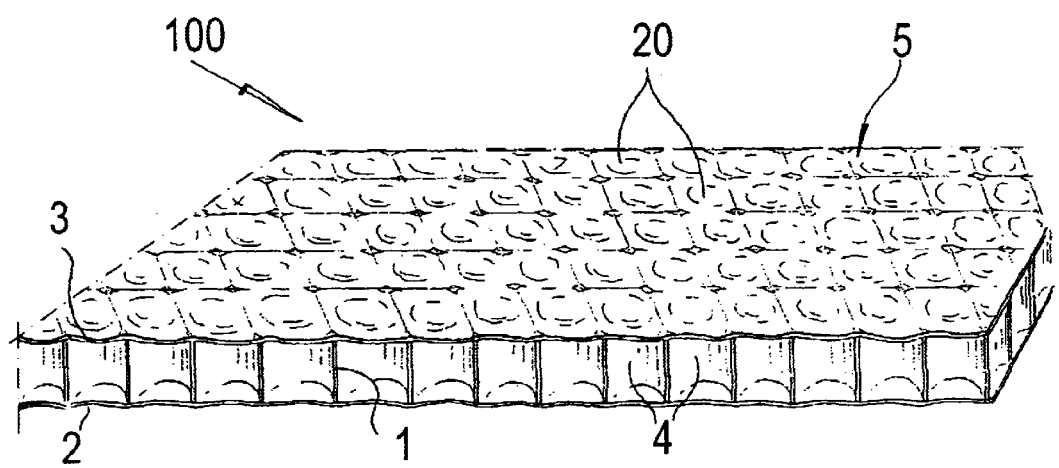
FIG. 3 is a perspective view of a sandwich panel in a somewhat enlarged presentation as compared to natural size.
Figure 4:
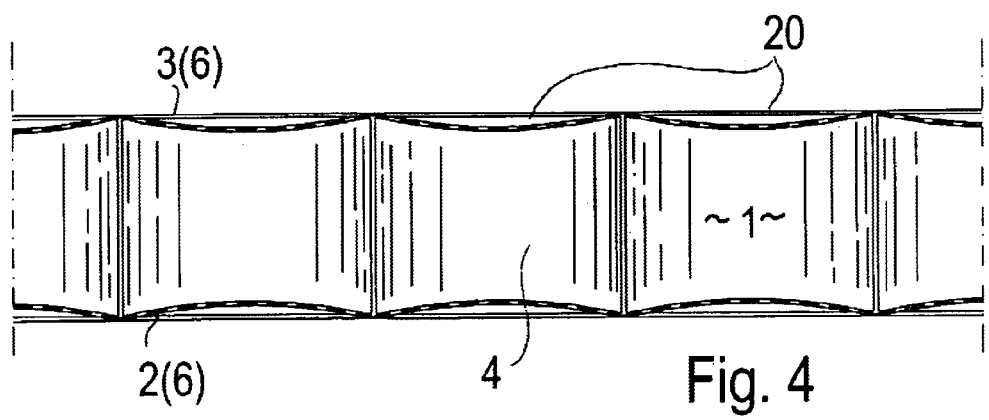
FIG. 4 is a side view of a sandwich panel according to FIG. 3 in an even more enlarged presentation.

The preferred embodiments of the present invention will now be described with reference to FIGS. 1–4 of the drawings. Identical elements in the various figures are designated with the same reference numerals.

The three-layer sandwich panel 100 shown in the FIGS. comprises a support core, or center layer 1, respectively, that is connected to an external layer 2 and 3 on either side. The center layer 1 is made of polyethylene in a honeycomb structure. A commercially available product (for example, the product "WaveCore" available from Wacotech GmbH & Co. KG) with a honeycomb diameter of 5 mm and a density of 75 kg/m$^3$ may be used. The height of the center layer is 4 mm. Such a layer is flexible and can be bent at least to a bending diameter of 10 cm without cracking or breaking.

A web material 6 made of an open glass fiber fabric 9 with a mesh size of about 5 mm lateral length or a glass fiber nonwoven 7 with an area mass of 30 g/m$^2$ is glued or hot-welded at the edges of the honeycomb to the center layer 1, which exhibits a coarse-cell honeycomb-like structure with cells 4 that are open towards the top and the bottom.

Thereafter, a relatively watery mortar compound is applied using a doctor knife such that this material enters into the glass fiber layer, but does not fill more than 20% of the honeycomb volume due to its viscosity. The result, after the mortar hardens, is a gray enforced mortar layer 7 with a thickness of about 1 mm that completely embeds the web material core.

The formulation of the mortar that is used as the coating compound for the exterior layers consists essentially of two components. One component is an elasticizing component that takes up 10 to 45 percent by weight, preferably 22 percent by weight of the entire mortar mass. The elasticizing component contains about 80 to 90 percent by weight of a dispersion of a copolymer of butyl acrylate and styrene, preferably dispersed in water, and 0.5 to 2% of a paraffin dispersion, in water as well. Epoxy resin dispersions may also be used. Such elasticizing components are essentially known and described in the prior art. After hardening, they make the synthetic resin mortar layer flexible without flaking or cracking. Cement (Portland cement) or gypsum, for example, but also other mineral building materials that set using water can be used as the mineral component. Cement, for example, is mixed into the dry mixture in an amount of 40 to 90 percent by weight. In addition, retarding agents, setting accelerators, thickening agents or antifoaming agents may be used as well. The mixture is prepared with water, which is absorbed in the course of the setting process by the cement or by another hydraulic binding agent, and integrated into the crystal structure.

It is important that after the mortar hardens the outer layer 5, or the outer layers, respectively, attain or retain an unrefined, or roughcast plaster-like outer surface that can be brushed with known tile adhesives, wood adhesives or the like, such that the panel can serve as a carrying construction panel.

Mortar that can be made in this manner, or with other formulations as described in the prior art, can be called "elasticized mortar". The resulting sandwich panel can be bent at a bending radius of 20 cm or less. Measurements were taken with a sandwich panel having a 4 mm thick polyethylene honeycomb structure, as the center layer 1, and two approximately 0.3 to 1 mm thick outer layers 2, 3. No flaking was observed.

Coloring pigments can also be added to the synthetic resin mortar. For example, adding titanium dioxide results in a very white color of the outer layer. Since cement essentially has a dark gray appearance after hardening, the natural color of the sandwich panel is gray.

Suitable for the core web material 6 are such substances that strongly bond with the liquid mortar due to their natural surface composition or because of respective secondary treatment. For example, polymer fibers in the form of a nonwoven 8 (cf. FIG. 2), or in the form of a woven 9 (cf. FIG. 1) or a knit fabric can be used. Glass fibers in the form of nonwovens and woven and knit fabrics have proven to be particularly well suited. However, it is also possible to use cellulose fibers in the form of a respective woven or knit fabric.

Preferably, the outside of the outer layer should not be smooth but should exhibit a structured surface. For example, it has been shown that when the mortar dries and becomes hard, and when using a glass fiber nonwoven, especially on the outside, numerous flat holes 20 that coincide with the openings of the cells 4 occur that provide an increased adhesion surface.

The compressive strength of the sandwich panel is set such that it is at least 10 N/cm$^2$ on the outer side, which is covered with an outer layer.

Such a sandwich panel is used similar to a building panel but with the great advantage that it is bendable and thus can be installed around corners. Additional layers, such as wallpaper, paint applications, facing tiles and soundproofing panel elements can be carried by the sandwich panel. It is also possible to use the panel to decouple a top layer from the base, which is viewed as a particular advantage. It can be used for tiling or as a base for natural stone or tiles. With installation on floor heating, a decoupling from the voltage-carrying base and at the same time an outstanding thermal conduction through the layer of mortar is accomplished.

Variations of the honeycomb size can be made in a wide range, preferably between 5 and 20 mm. The compressive strength of the carrier material can be chosen such that it is also suitable for wheelchairs, if installed carpet, PVC or linoleum coverings require it.

There has thus been shown and described a novel flexible sandwich panel with honeycomb structure which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a flexible sandwich panel, comprising, in combination:
    (a) a center layer made of a polymeric synthetic material, which is flexible and exhibits a coarse-cell honeycomb structure with open cells in the direction of the upper and lower side of the center layer; and
    (b) at least one outer layer laminated to at least one side of the center layer and covering said center layer;
    the improvement wherein said at least one outer layer comprises a hardened mortar that is made flexible with synthetic additives, and that has as its core a web material consisting essentially of fibers, and wherein the exterior side of the hardened mortar is roughcast in a plaster-like manner.

2. A flexible sandwich panel as set forth in claim 1, wherein the core web material is attached to one side of the center layer.

3. A flexible sandwich panel as set forth in claim 1, wherein the web material is made of polymeric fibers in the form selected from the group consisting of a nonwoven, a woven and a knit fabric.

4. A flexible sandwich panel as set forth in claim 1, wherein the web material is made of glass fibers in the form selected from the group consisting of a nonwoven, a woven and a knit fabric.

5. A flexible sandwich panel as set forth in claim 1, wherein the web material is made of cellulose fibers in the form of a nonwoven.

6. A flexible sandwich panel as set forth in claim 3, wherein, for the woven or knit fabric, the average stitch diameter is preferably at most 50% of the mean diameter of a honeycomb of the honeycomb structure of the center layer.

7. A flexible sandwich panel as set forth in claim 1, wherein the mortar belonging to an outer layer fills a maximum of 33% of the hollow space volume of the center layer.

8. A flexible sandwich panel as set forth in claim 1, wherein the outer layer on its outside exhibits numerous flat holes that coincide with the openings of the cells.

9. A flexible sandwich panel as set forth in claim 1, wherein cement serves as the mineral component of the mortar.

10. A flexible sandwich-panel as set forth in claim 1, wherein gypsum serves as the mineral component of the mortar.

11. A flexible sandwich panel as set forth in claim 1, wherein the compressive strength of the sandwich panel is at least 10 N/cm$^2$ on the outer side, which is covered with an outer layer.

12. A flexible sandwich panel as set forth in claim 1, wherein the thickness of the center layer is between 5 and 25 mm.

13. A flexible sandwich panel as set forth in claim 1, wherein the center layer comprises material selected from the group consisting of a polyolefin, polyolefin copolymers, polyester, polycarbonate and polyamide.

14. A flexible sandwich panel as set forth in claim 1, wherein the center layer has a density between 10 kg/m$^3$ and 100 kg/m$^3$.

15. A flexible sandwich panel as set forth in claim 1, wherein for a thickness of the center layer of between 4 and 7 mm and a thickness of said at least one outer layer of between 0.3 and 1 mm, the achievable bending radius of the sandwich panel without flaking is at least 20 cm.

16. Use of a sandwich panel as set forth in claim 1 as building panel and carrier for additional layers such as wall paper, paint applications, facing tiles and soundproofing panel elements.

17. Use of a sandwich panel as set forth in claim 1 as an intermediate layer element between a pipe holding panel covered with pipes, for floor heating, on one hand, and a top layer that can be walked on, on the other.

18. Use of a flexible sandwich panel as set forth in claim 17, wherein the top layer is selected from the group consisting of parquet boards and a carpet.

19. A flexible sandwich panel as set forth in claim 2, wherein the core web material is attached to one side of the center layer by means of an adhesive.

20. A flexible sandwich panel as set forth in claim 2, wherein the core web material is attached to one side of the center layer by means of a hot weld.

21. A flexible sandwich panel as set forth in claim 4, wherein, for the woven or knit fabric, the average stitch diameter is preferably at most 50% of the mean diameter of a honeycomb of the honeycomb structure of the center layer.

* * * * *